United States Patent [19]

Angelini et al.

[11] 4,177,874

[45] Dec. 11, 1979

[54] ACTIVE ACOUSTIC SOUND ABSORBER DEVICE

[75] Inventors: Theophile A. Angelini; Bernard J. P. Nayrole; Maurice J. Jessel; Georges Canévet; Gerard A. Mangiante; Bernard Carbone, all of Marseilles, France

[73] Assignee: Agence Nationale de Valorisation de la Recherche (ANVAR), Neuilly-sur-Seine, France

[21] Appl. No.: 891,340

[22] Filed: Mar. 29, 1978

[30] Foreign Application Priority Data

Apr. 1, 1977 [FR] France ................. 77 10497

[51] Int. Cl.² ............................................. F01N 1/06
[52] U.S. Cl. ................................................. 181/206
[58] Field of Search ................. 181/206; 179/1 P; 333/30 R

[56] References Cited

U.S. PATENT DOCUMENTS 3,565,209  2/1971  Babcock et al. ............... 181/206
3,826,870  7/1974  Wurm et al. .................. 181/206
3,936,606  2/1976  Wanke ......................... 181/206

FOREIGN PATENT DOCUMENTS 7341862  6/1974  France ........................ 181/206
7534025 10/1975  France ........................ 181/206

*Primary Examiner*—Donald A. Griffin
*Assistant Examiner*—Benjamin R. Fuller
*Attorney, Agent, or Firm*—Lewis H. Eslinger

[57] ABSTRACT

The invention relates to active acoustic absorber devices for absorbing the sounds which are emitted by a emitter source and which propagate therefrom, along a pipe. An absorber according to the invention comprises an acoustic tripole which is composed of two auxiliary acoustic sources which constitute a dipole and of a third auxiliary source which constitutes a unipole, these three sources being located in the same acoustic chamber, which chamber is disposed outside the pipe, opens therein through three orifices aligned parallel to the longitudinal axis of the pipe and comprises a transverse plane of symmetry perpendicular to the axis of the pipe.

9 Claims, 4 Drawing Figures

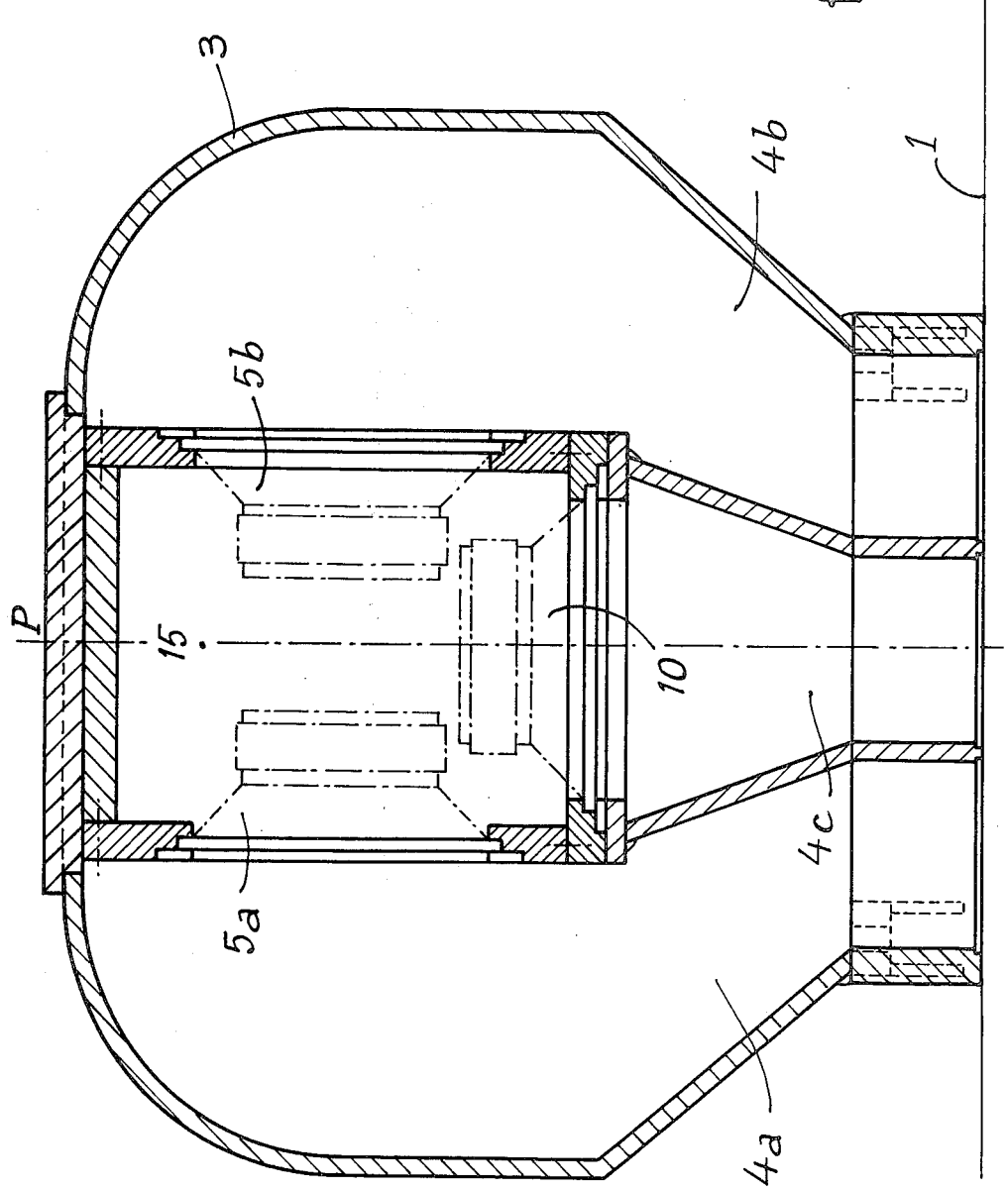

ACTIVE ACOUSTIC SOUND ABSORBER DEVICE

The invention relates to active acoustic absorber devices for absorbing the sounds which are emitted by an emitter source and which are propagated therefrom along a pipe.

The definition of certain terms used in the present specification will firstly be specified.

The term pipe denotes any hollow body or channel, of elongated form, having a small transverse section with respect to the wavelength of the sounds and a sufficient length for the acoustic waves to propagate therein in the form of plane waves, which is the case, in practice, for a sound of wave length $\lambda$, as soon as one is located at a distance from the emitter source greater than $5\lambda$.

Practical examples of pipes are ventilation, heating or pulsed-air-conditioning shafts, motor exhaust pipes, chimneys, reactor pipes, etc. . .

The term active acoustic absorber denotes an absorber which emits acoustic waves which interfere with sounds in order to attenuate them. The qualification of active absorbers is opposed to that of passive absorbers which are inert materials which pick up part of the sound energy and which dissipate it in the form of heat. The passive acoustic absorbers make it possible to fight against high frequency sounds, but cannot be used efficiently to absorb deep tones, in the low frequencies, due to the considerable thickness of the absorbent material which is then necessary.

The term dipole is used to denote an assembly of two close acoustic sources, the directivity pattern of which is in the form of a figure of eight and presents two lobes perfectly symmetrical with respect to the mediator plane of the two sources and such that for any pair of two symmetrical points with respect to the mediator plane of the two sources, the acoustic waves coming from the dipole at these two points are constantly in phase opposition.

The term unipole designates a single, omnidirectional acoustic source of which the directivity pattern presents a circular lobe centered on the source.

The term tripole denotes an assembly of three close acoustic sources which constitute a unipole and a dipole, the unipole being in phase with one of the sources of the dipole. If the median plane of the tripole which is also that of the dipole, is considered, a tripole does not emit any acoustic wave on the side of the plane where the acoustic waves emitted by the dipole and the unipole are in phase opposition with respect to each other. On the other side of this plane, the tripole emits plane acoustic waves and the directivity pattern is cardioid in form. It is these waves which are made to interfere with the sound which it is desired to absorb.

The absorption of sounds by means of a tripole has formed the subject matter of theoretical studies. It has been described in particular by JESSEL in the Revue d'Acoustique 5 No. 18 (1972), pages 37-42, by MANGIANTE in a Doctorate thesis defended at the Science Faculty of Marseille on Dec. 19, 1974 and by CANEVET and MANGIANTE in the journal Acustica 30 No. 1 (1974), pages 40-48.

Embodiments of devices carrying out the theoretical studies of JESSEL and MANGIANTE are described in French Patent No. 73 41862 (NATIONAL RESEARCH DEVELOPMENT CORPORATION) and in French Patent 75 34025 (AGENCE NATIONALE DE VALORISATION DE LA RECHERCHE).

However, the practical efficacy of the devices which have been experimented heretofore is not satisfactory due to the difficulty encountered in having industrial sounds which cover a wide frequency band interfered with constantly and perfectly in all points in space.

The absorber device which have been described by the present Applicants, in earlier French Patent No. 75 34025 or main Patent, comprised, on the one hand, a dipole located in a common acoustic chamber and, on the other hand, a unipole placed in a second chamber separated from the first.

Experience has shown that this arrangement led to delicate adjustments which depended, each time, on the dimensions of the pipe on which an absorber was installed.

It is an object of the present invention to remedy these drawbacks using improved tripoles, the absorbent power of which is more efficient and extends over a wide frequency band.

An active acoustic absorber device according to the invention is intended to absorb the sounds which are emitted by an emitter source and which propagate therefrom along a pipe.

A device according to the invention comprises a tripole which is composed:

of two auxiliary acoustic sources which constitute a dipole, and of a third auxiliary source which constitutes a unipole, which three auxiliary sources are located in the same acoustic chamber which chamber is disposed outside said pipe in which it opens out through three orifices aligned parallel to the longitudinal axis of said conduit and comprises a transverse plane of symmetry, perpendicular to the axis of said conduit.

The unipole comprises a plane of symmetry and this plane is merged with the transverse plane of symmetry of the acoustic chamber. The acoustic chamber communicates with the pipe via three bell-mouthed horns, which converge towards the pipe. According to a preferred embodiment, the dipole and the unipole are each constituted by an electro-acoustic transducer, for example by a loud-speaker, which three transducers are identical and excited by the same electrical oscillation generator, and the two transducers of the dipole are excited in phase opposition whilst the transducer of the unipole is excited in phase with the transducer of the unipole which is most remote from said emitter source.

Each of the three electroacoustic transducers comprises a vibrating membrane of substantially flat form and the vibrating membranes of the two transducers of the dipole are disposed parallel to said transverse plane of symmetry, on either side of said latter, whilst the vibrating membrane of the dipole is disposed between the two membranes of the two transducers of the dipole and is perpendicular to said transverse plane of symmetry.

In a preferred embodiment, the three membranes are disposed on three faces of the same closed chamber, so that the three transducers are coupled acoustically.

A device according to the invention preferably comprises an adjustable delaying or phase-shifting device, which is interposed between said generator and the transducer constituting the unipole, which device enables the acoustic waves emitted by the unipole to be delayed or phase-shifted with respect to the waves emitted by the transducers of the dipole in order to obtain a tripole whose properties are similar to those of a theoretical tripole.

The electrical oscillation generator is preferably an amplifier which is connected to a microphone, placed inside said pipe between said emitter source and said tripole, which device comprises a second phase-shifting circuit, interposed between said microphone and said amplifier.

The second phase-shifting circuit is preferably controlled by a second microphone which is placed in the circuit, downstream of the tripole.

The invention results in new improved active acoustic absorbers.

An integrated tripole according to the invention enables a frequency band of between 50 Hz and 1000 Hz to be covered.

It is possible to design tripoles having good properties of sound absorption in other frequency bands.

A similar device has been produced, which functions between 1000 Hz and 6000 Hz.

The tests which have been made have shown that a sound or a plurality of pure sounds, included in a band of width $\Delta F = 125$ Hz are strongly attenuated within a frequency band ranging from 50 Hz to 1000 Hz.

A sound having an initial level of 110 dB is reduced to a level of about 50 dB.

Compared with the acoustic absorbers described in French Patent No. 75 34025, the improved absorbers according to the present Application, composed of an integral tripole in which the unipole is located in the same chamber as the dipole, present the advantage that it is possible to dispose the three sources, for example three loud-speakers, so that their rear faces are located in the same chamber. This results in an acoustic coupling of the three sources which procures a balancing of the acoustic intensities and a good placing in phase (or in phase opposition) of the unipole with each of the two sources constituting the dipole.

The union of the unipole and the dipole in an integrated tripole contained in the same chamber presents several advantages.

It facilitates the installation of an absorber device on a shaft since there is only one chamber to install.

The efficiency of the acoustic absorber depends on the qualities of the tripole which must be as close as possible to the properties of a theoretical tripole having a directivity pattern in cardioid form, the emission directed towards the source being zero. Moreover, the good quality of the tripole must exist on a frequency band whose width covers that of the sounds to be absorbed, for example on a band of between 50 Hz and 1000 Hz.

The absorber devices described in the main patent require that the tripole be adjusted as a function of the shaft on which it is placed since the distance between the unipole and the dipole varied as a function of this shaft.

The integrated tripoles according to the invention present the advantage of being independent of the shaft on which they are located, this enabling each tripole to be adjusted in advance and independently of the pipe on which it must be installed.

In the case of the loud-speaker which constitutes the unipole being supplied in phase with a loud-speaker of the dipole, a tripole is obtained, due to the acoustic coupling, having satisfactory properties but in a fairly narrow band, for example between 70 Hz and 300 Hz.

By interposing a phase-shifter or delay circuit between the amplifier and the unipole, the band within which the tripole conserves satisfactory properties is enlarged. Experience has shown that in this way an integrated tripole was obtained which made it possible to obtain a good acoustic absorption within a band of between 50 Hz and 1000 Hz.

The invention will be more readily understood by reading the following description with reference to the accompanying drawings, in which:

FIG. 2 is a longitudinal section through the absorber of FIG. 1.

Figure 1:
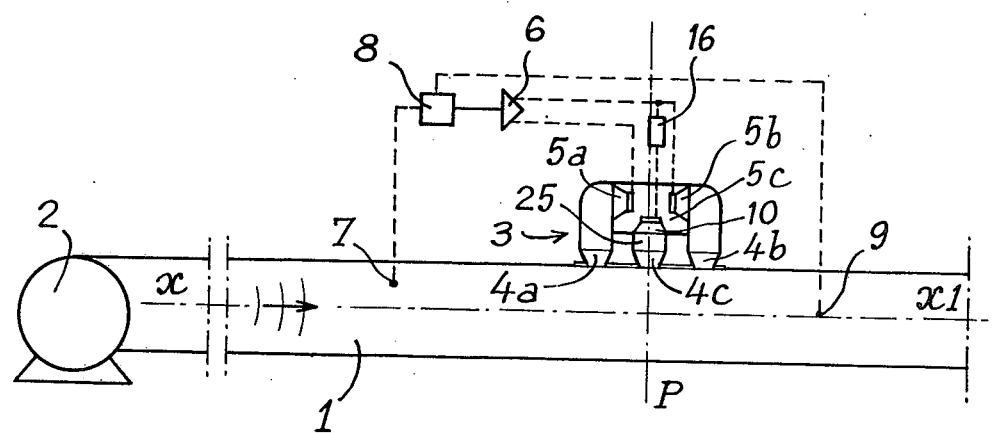
FIG. 1 is a schematic view of an acoustic absorber according to the invention.

Referring now to the drawings, FIG. 1 shows a pipe 1, for example an air-conditioning shaft, in which a fan 2 blows air and emits sounds which it is desired to reduce.

The acoustic absorber device according to the invention is located inside a single acoustic enclosure or chamber 3 placed outside the pipe 1. This chamber contains an integrated tripole which is composed, on the one hand, of a dipole 5a, 5b and on the other hand of a unipole 10.

The dipole and the unipole are constituted by identical, electroacoustic transducers, for example by loud-speakers which are connected to the outputs of an amplifier 6, on the input of which is branched, via a phase-shifting circuit 8, a microphone 7 placed inside the shaft, upstream of the absorber.

The phase shifter 8 may be automatically controlled by the intensity of the sound measured by a second microphone 9 placed in the shaft downstream of the absorber.

The loud-speakers 5a and 5b are connected in parallel and in phase opposition on the outputs of the amplifier. The loud-speaker 10 is connected by means of a delay circuit 16 to the same output of the amplifier 6 as the loud-speaker 5b.

The chamber 3 comprises a housing in the general form of a U having two open ends 4a and 4b which communicate with the pipe 1. These two ends are aligned in a direction parallel to the axis x-x1 of the pipe. Each end opens out in the pipe 1 through a horn having having lateral side walls which are convergent with each other towards the pipe.

The acoustic housing or enclosure 3 includes a chamber 15 and two lateral channels which, together, define the general form of a U. This U-shaped enclosure has a plane of symmetry P which is transversed to the chamber 16. The two lateral channels are symmetrical with respect to the transverse plane of symmetry P, which is perpendicular to the axis x-x1 of pipe 1. Two loudspeakers 5a, 5b are disposed across the chamber 15, symmetrically with respect to the plane P. The rear faces of the loudspeakers are placed with respect to each other on either side of the plane P so that the chamber 15 is closed.

A third loud-speakers 10 is placed between the two loud-speakers 5a, 5b, its axis being located in the plane of symmetry P and its membrane being perpendicular to the plane P.

The rear face of the loud-speaker 10 is located in the said chamber 15 as the rear faces of the loud-speakers 5a, 5b so that an acoustic coupling is produced between the three loud-speakers.

The enclosure or housing 3 further includes a median channel 25 which is placed between the lateral channels parallel to and symmetrical with respect to the plane P and which opens out into the pipe 1 via a third horn 4c aligned with the horns 4a and 4b. This horn has lateral walls which converge with each other towards the pipe.

The front face of the loud-speaker 10 is located at the end of the channel 25 opposite the horn 4c. The channel 25 and the horn 4c are symmetrical with respect to the plane P. The plane P is a plane of symmetry for the channels and for the loud-speakers which compose the acoustic chamber 3.

FIG. 1 shows an embodiment in which the channel 25 and the horn 4c are separated from horns 4a and 4b. FIG. 2 shows, on a larger scale, a variant in which the horn 4c occupies the whole space between the horns 4a and 4b and the side walls of the horn 4c converge with each other from the front face of the loud-speaker 10.

Figure 3A:
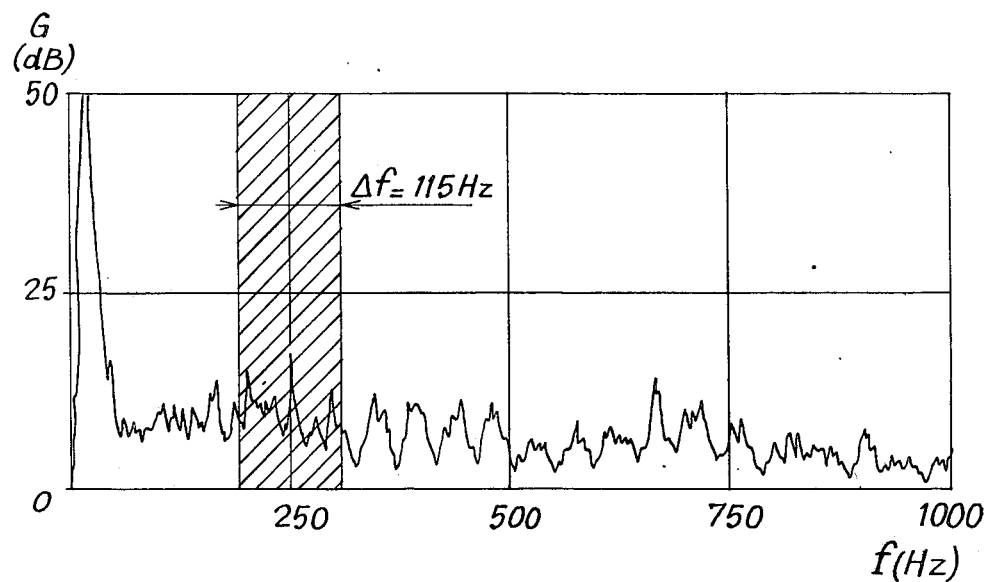
FIGS. 3a and 3b show comparative recordings of the sounds in an air-conditioning shaft fitted or not with an acoustic absorber.
Figure 3B:
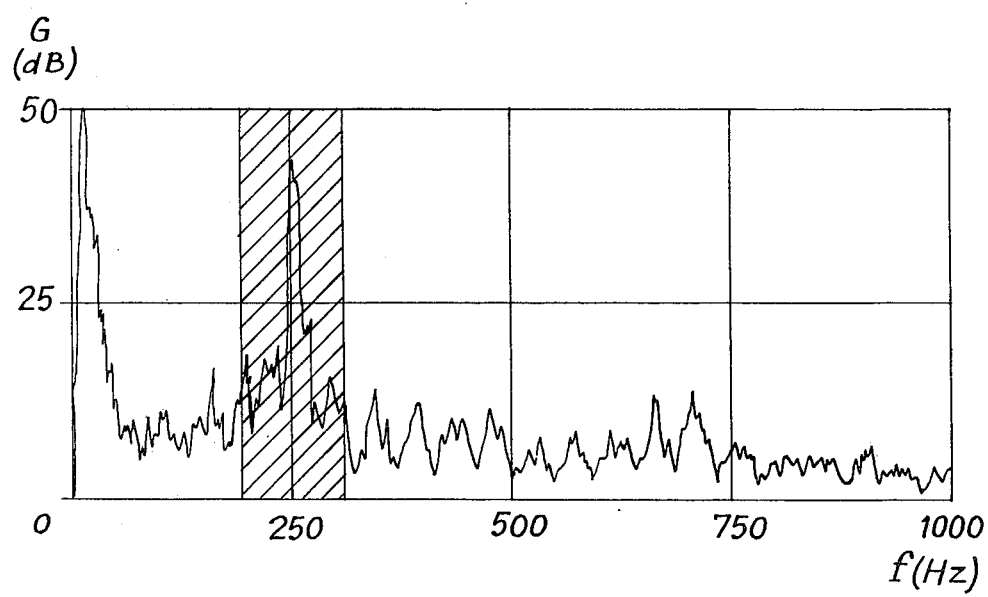

FIG. 3b shows a recording, in the frequency band lower than 1000 Hz, of industrial sounds at the outlet of an air-conditioning shaft in which the air circulates at a velocity of 7 m/sec.

FIG. 3a shows a comparative recording at the outlet of the same shaft fitted with an acoustic absorber constituted by an integrated tripole according to invention. The hatched zone having a width $\Delta F = 115$ Hz represents the band in which the absorber attenuates the sounds.

The recording of FIG. 3a shows on the frequency 250 Hz an intense sound having a level of the order of 45 dB above an arbitrary reference 0. FIG. 3a shows that this noise is attenuated by about 20 dB.

The circuit 16 allows a slight delay or a slight phase shift to be introduced between the waves emitted by the unipole and the waves emitted by the dipole in order to correct the gap due to the difference in the lengths of paths which separate the membranes of the shaft.

As the unipole is integrated in the same chamber as the dipole, the respective lengths of these paths are independent of the shaft, with the result that it is possible, by acting on the circuit 16, to adjust, in the workshop, the properties of the tripole independently of the shaft on which it must be installed in order that the properties of the tripole approach those of a theoretical tripole, within a sufficiently wide band to cover the band in which the undesirable sounds are located.

What is claimed is:

1. An active acoustic absorber device for absorbing sounds emitted by an emitter source and which propogate therefrom along a pipe having a longitudinal axis, comprising an acoustic tripole including two auxiliary sources which constitute a dipole and a third auxiliary source which constitutes a unipole; a single acoustic enclosure placed outside said pipe comprising a housing having the general form of a U including a chamber having a plane of symmetry transverse to said chamber and perpendicular to the longitudinal axis of said pipe, two lateral channels parallel to said plane and symmetrical with respect to said transverse plane of symmetry, each lateral channel having an open end which opens out into said pipe, and a median channel which is parallel to said transverse plane of symmetry and symmetrically located with respect thereto, said median channel having an open end which opens out into said pipe; said two auxiliary sources which constitute the dipole being located across said chamber, symmetrically with respect to said transverse plane of symmetry and said auxiliary source which constitutes the unipole being located in said median channel, symmetrically with respect to said transverse plane of symmetry.

2. A device according to claim 1 in which the open ends of said two lateral channels and the open end of the median channel are aligned in a direction parallel to said longitudinal axis of said pipe.

3. A device according to claim 1, in which said lateral channels and said median channel comprise three bell-mouthed horns having side walls which converge with each other towards said pipe.

4. A device according to claim 1, wherein the auxiliary sources each comprise an electroacoustic transducer, said transducers being identical, electrical oscillation generator means for exciting said transducers, the two transducers of the dipole being excited by said means in phase opposition and the transducer of the unipole being excited in phase with the transducer of the dipole which is most remote from said emitter source.

5. A device acccording to claim 4, wherein each of the three electroacoustic transducers comprises a vibrating membrane of substantially flat form and the vibrating membranes of the two transducers of the dipole are disposed parallel to said transverse plane of symmetry, on either side of said latter, and the vibrating membrane of the unipole is disposed between the two membranes of the two transducers of the dipole and is perpendicular to said transverse plane of symmetry.

6. A device according to claim 5, wherein the three membranes are disposed on three faces of said chamber whereby the three transducers are coupled acoustically.

7. A device according to claim 4, including adjustable delay circuit means interposed between said generator and the transducer constituting the unipole for delaying the acoustic waves emitted by the unipole with respect to the waves emitted by the transducers of the dipole with order to obtain a tripole whose properties are similar to those of a theoretical tripole.

8. A device according to claim 4, wherein said electrical oscillation generator means comprises an amplifier and a microphone connected thereto, said microphone being placed inside said pipe between said emitter source and said tripole, and a phase-shifting means interposed between said microphone and said amplifier.

9. A device according to claim 8, including a second microphone placed in the circuit, downstream of the tripole and connected to said phase shifting circuit.

* * * * *